United States Patent [19]

Fowler et al.

[11] Patent Number: 5,438,172

[45] Date of Patent: Aug. 1, 1995

[54] ZERO BACKLASH POSITION ENCODER

[75] Inventors: James H. Fowler, Novi, Mich.; Edward G. VanNimwegen, North Ogden, Utah

[73] Assignees: Ford Motor Company, Dearborn, Mich.; Bourns Inc., Riverside, Calif.

[21] Appl. No.: 106,743

[22] Filed: Aug. 16, 1993

[51] Int. Cl.⁶ .................... H01H 19/54; F16D 3/00
[52] U.S. Cl. ................. 200/11 R; 200/11 G; 200/17 R; 464/183
[58] Field of Search .......... 200/11 R, 11 D, 11 DA, 200/11 G, 11 J, 11 TW, 14, 17 R, 18; 74/409; 464/101, 102, 106, 162, 185

[56] References Cited

U.S. PATENT DOCUMENTS

| | | | |
|---|---|---|---|
| 2,454,122 | 11/1948 | Barger | 192/48.91 |
| 2,680,383 | 6/1954 | Lahti | 74/528 |
| 2,920,502 | 1/1960 | Bungart | 74/665 B |
| 3,158,034 | 11/1964 | Williamson | 74/10 R |
| 3,166,714 | 1/1965 | Hien | 455/173.1 |
| 3,267,749 | 8/1966 | Tanner et al. | 74/10.45 |
| 3,621,962 | 11/1971 | Aoki | 192/95 |
| 3,736,390 | 5/1973 | Lockard | 200/11 G X |
| 3,761,649 | 9/1973 | Jedynak et al. | 200/14 |
| 3,875,761 | 4/1975 | Bergson | 464/160 |
| 4,132,972 | 1/1979 | Tumbusch | 338/180 |
| 4,225,765 | 9/1980 | Johnston et al. | 200/307 |
| 4,866,219 | 9/1989 | Riding et al. | 200/4 |
| 5,185,804 | 2/1993 | Watanabe | 381/86 |
| 5,187,997 | 2/1993 | Henry-Moore | 74/493 |

FOREIGN PATENT DOCUMENTS 0102332  3/1984  European Pat. Off. .
1750181  1/1971  Germany .

Primary Examiner—J. R. Scott
Attorney, Agent, or Firm—Mark Mollon; Roger L. May

[57] ABSTRACT

In an electronic position encoder (or other panel control) of the type having a shaft-retracted position for storage and a shaft-extended position for adjustment, an anti-backlash coupling substantially eliminates backlash between a rotor and a shaft. The anti-backlash coupling includes a first wedge member fixedly coupled to the shaft and a second wedge member fixedly coupled to the rotor. The second wedge member is adapted to mate with the first wedge member when the shaft is in the extended position.

16 Claims, 6 Drawing Sheets

ZERO BACKLASH POSITION ENCODER

BACKGROUND OF THE INVENTION

1. Field of the Invention

The invention relates to the field of rotary position encoders for electronic instruments, and more specifically, to rotary position encoders of the type having a shaft-retracted position for storage and a shaft-extended position for adjustment.

2. Related Art

Position encoders are used in a variety of applications for electronic instruments. A position encoder converts a rotary motion caused by a user turning a knob to a varying electrical signal which can be used to adjust an operational parameter of an electronic instrument. For example, a position encoder may be used to adjust the volume in an automobile audio system.

In one type of rotary position encoder, the encoder shaft is movable longitudinally or axially between a retracted position and an extended position. In the retracted position, the encoder shaft may be stored such that it extends only slightly from the front panel of an instrument. In the extended position, the shaft moves longitudinally out from the panel for ease of adjustment.

A spring loaded toggle system allows the shaft to move between the two positions by simply depressing the end of the shaft. The capability of providing both rotary and longitudinal movement is achieved by keying the shape of the shaft and the rotor plate within the encoder so that the rotor will turn with the shaft while permitting the shaft to move freely through the rotor in an axial or longitudinal direction.

In order to accommodate both rotary coupling and longitudinal movement while accounting for manufacturing tolerances, a minimum amount of "clearance" or imprecision must be present between the size of the keyed opening in the rotor and the size of the keyed shaft. This imprecision results in what is known in the industry as "backlash" in the rotary coupling between the shaft and the rotor. This is undesirable in most applications either because of the need for positional accuracy or the perceived lack of quality in the tactile feel of the device.

SUMMARY OF THE INVENTION

The invention is an electronic encoder assembly of the type having a shaft-retracted position for storage and a shaft-extended position for adjustment. In the shaft-extended position, the encoder assembly has substantially zero backlash. Zero backlash is achieved by means of an anti-backlash coupling.

The encoder assembly includes a keyed shaft rotatable about a longitudinal axis. A rotor having a keyed opening through which the shaft is passed engages the shaft such that the rotor rotates with the shaft about the longitudinal axis while still allowing the shaft to translate freely through the opening along the longitudinal axis. The shaft moves longitudinally between a shaft-retracted position and a shaft-extended position. The anti-backlash coupling substantially eliminates backlash when the shaft is in the extended position.

The anti-backlash coupling is an important feature of the invention. The anti-backlash coupling includes a male coupler or male wedge member and a female coupler or female wedge member. The male coupler has at least one outwardly tapering extension. The female coupler has at least one inwardly tapering recess configured and arranged to mate with the extension of the male coupler. One of the couplers is attached to the rotor. The other coupler is attached to the shaft such that when the shaft is in the extended position, the couplers are engaged under a compressive or spring load and the tapered mating of the extensions with the recesses causes a positive linking between the shaft and the rotor such that backlash is substantially eliminated.

In the preferred embodiment, the male coupler is an annulus which has two outwardly tapering extensions which are disposed 180° apart thereon. Correspondingly, the female coupler is an annulus which has two inwardly tapering recesses which are disposed 180° apart.

The encoder further includes a binary switch element for sensing the position of the rotor and allowing electrical detection thereof. A coil spring is configured and arranged to urge the shaft into the extended position such that the male and female couplers are urged into positive engagement. An actuator assembly and a cam plate selectively retain the shaft in either the extended position or the retracted position. Actuation is achieved by depressing the shaft.

In the preferred embodiment, the encoder assembly includes a toggle switch which is actuated by longitudinal translation of the shaft. The distal end of the shaft causes a moving contact to CLOSE with a stationary contact when the shaft is in the retracted position. When the shaft is in the extended position, the moving contact and the stationary contact are caused to OPEN.

The foregoing and other objects, features and advantages of the invention will be apparent from the following, more particular description of a preferred embodiment of the invention, as illustrated in the accompanying drawings.

DETAILED DESCRIPTION OF THE PREFERRED EMBODIMENTS

The preferred embodiment of the invention is discussed in detail below. While specific configurations and arrangements are discussed, it should be understood that this is done for illustration purposes only. A person skilled in the art will recognize that other configurations and arrangements may be used without departing from the spirit and scope of the invention.

The preferred embodiment of the invention is now described with reference to the figures where like reference numbers indicate like elements. Also in the figures, the left most digit of each reference number corresponds to the figure in which the reference number is first used.

The figures show an electronic encoder assembly 100. In the preferred embodiment, encoder 100 is a two-channel, digital encoder having 36 states. Each state represents 10 degrees of rotation of the shaft. In addition, encoder 100 includes a switch responsive to the position of the shaft for toggling between a first state when the shaft is in a retracted position and a second state when the shaft is in the extended position. Encoder 100 is used, for example, as the volume control and ON/OFF switch for an automobile audio system. The rotary encoder feature is used to control the volume of the audio system. The shaft position indicating switch is used to control the ON/OFF state of the audio system.

Figure 1:
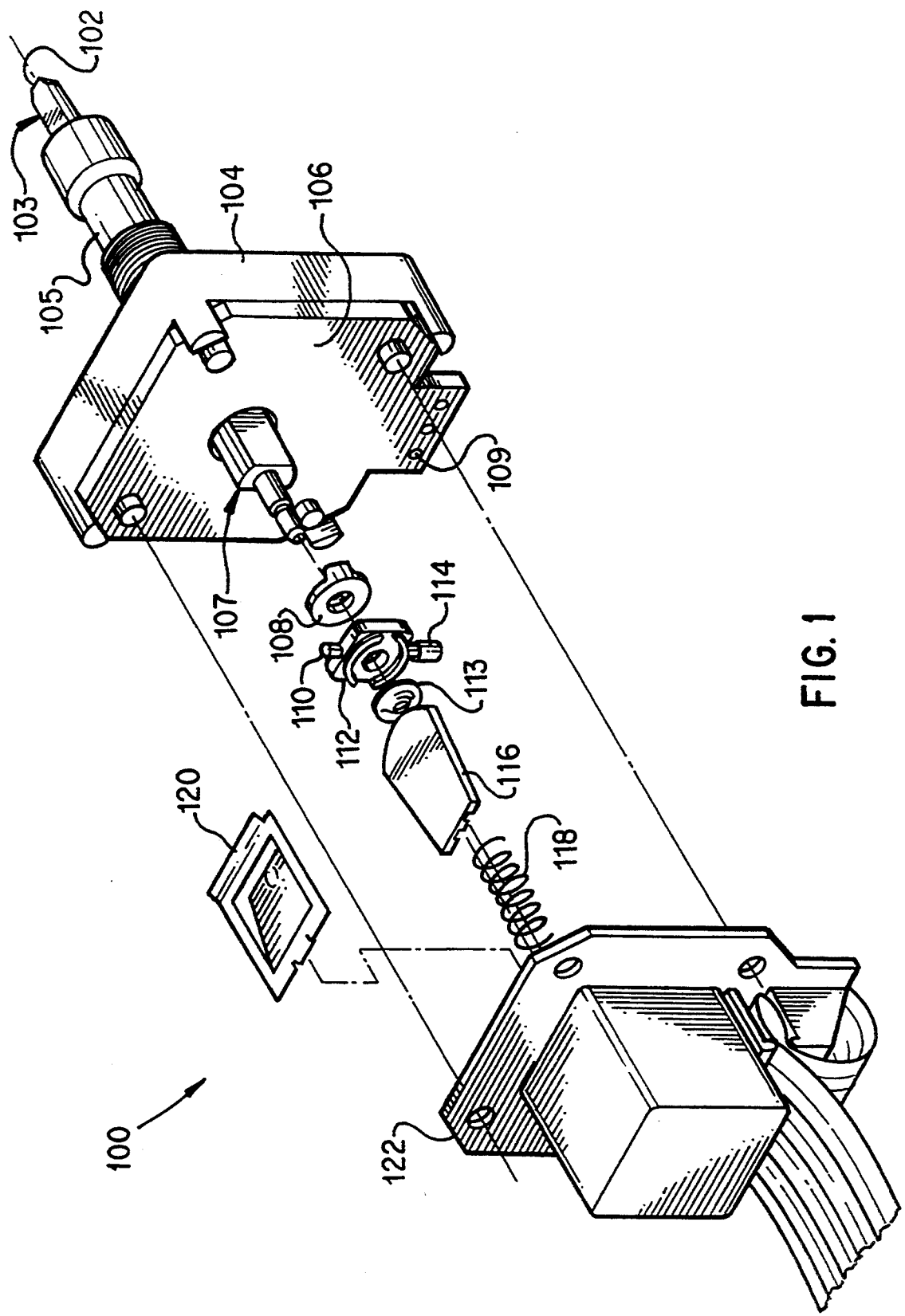
FIG. 1 is a perspective, exploded view of the encoder assembly of the invention illustrating the components located between a binary switch element 106 and a body 122.
Figure 2:
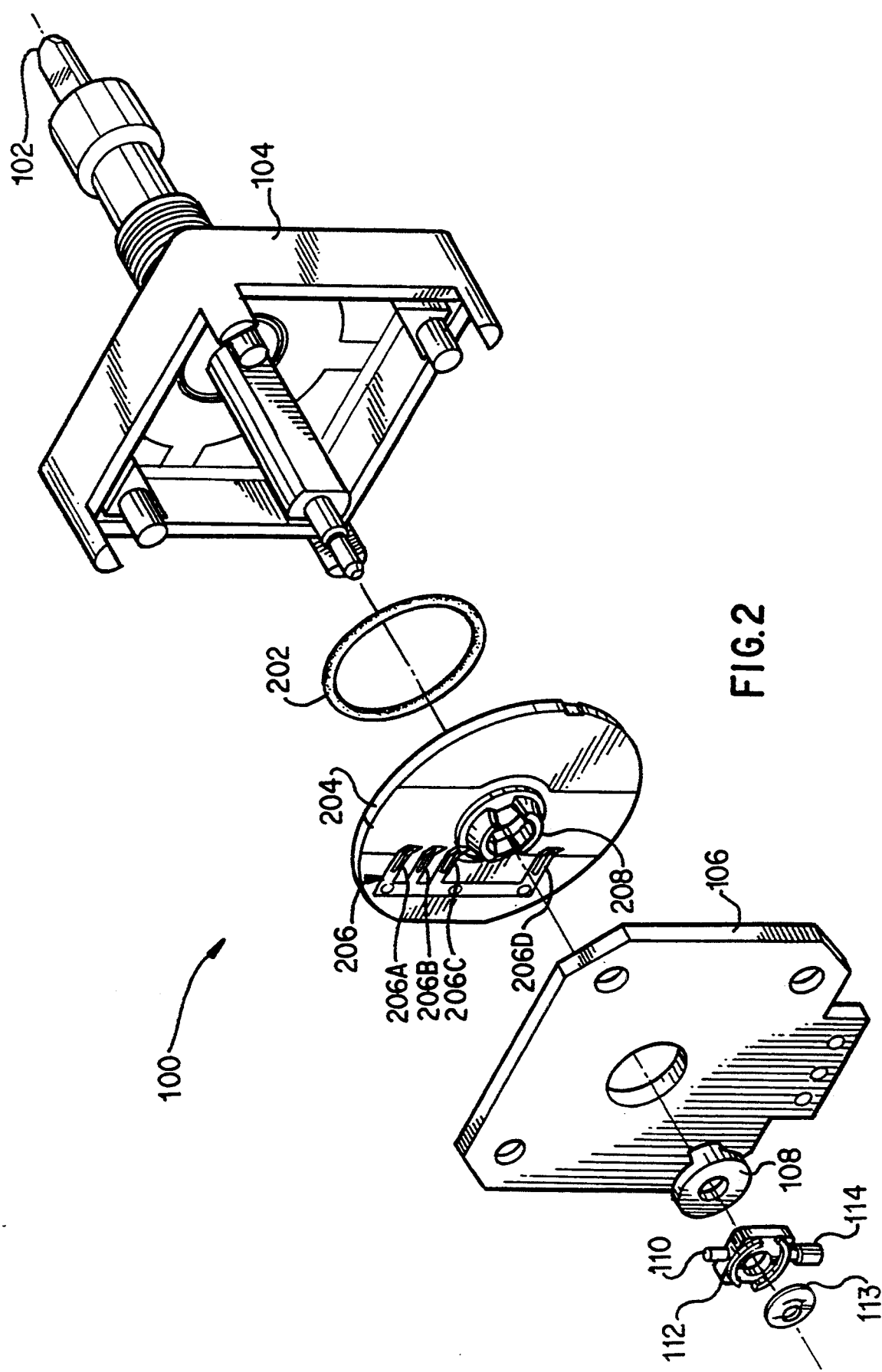
FIG. 2 is a perspective, exploded view of the encoder assembly of the invention illustrating the components located between a housing 104 and an actuator assembly 112.

As shown in FIGS. 1 and 2, Encoder 100 includes a shaft 102, a housing 104, an O-ring 202, a rotor 204, a spring-contact assembly 206, a female coupler or female wedge member 208, a binary switch element 106, a male coupler or male wedge member 108, an actuator assembly 112, a cam plate 116, a coil spring 118, a backup spring 120, a switch moving contact 604 (shown only in FIG. 6), a switch stationary contact 602 (shown only in FIG. 6), and a body 122. As illustrated, shaft 102 extends longitudinally through housing 104, through O-ring 202, through a central opening in rotor 204, through female coupler 208, through binary switch element 106, and is fixedly coupled at its distal end to male coupler 108. Actuator assembly 112 is axially coupled to the distal end of shaft 102 and allowed to rotate freely thereon. A retainer clip 113 retains actuator assembly 112 and female coupler 208 on shaft 102.

Shaft 102 is a substantially cylindrical shaft which is keyed to allow rotary coupling with rotor 204. By "keyed," it is meant that the cross-sectional shape of the shaft is modified from being completely round such that rotational forces may be coupled from the shaft to rotor 204. In the preferred embodiment, the cross-sectional shape of shaft 102 is a circle with two parallel flat sides. Corresponding to this shape, rotor 204 has a similarly-shaped central opening through which shaft 102 passes. To accommodate manufacturing variance and allow free longitudinal movement of shaft 102 through this central opening, the opening is slightly larger than the shaft. As described above, this clearance (between the opening and the shaft) is the cause of undesirable backlash in known position encoders.

A proximal portion 103 of shaft 102 is keyed with a half-circle-shaped cross-section for receiving a knob. A collar portion 105 of shaft 102 provides a stop to prevent shaft 102 from being retracted into housing 104 beyond a pre-selected position. A keyed portion 107 of shaft 102 is configured to mate with rotor 204.

Actuator assembly 112, cam plate 116, spring 118 and backup spring 120 work in conjunction with body 122 to selectively maintain shaft 102 in either an extended position or a retracted position. Spring 118 is axially aligned with shaft 102 such that the actuator assembly compresses the spring against the backside of body 122 when the proximal end of shaft 102 is depressed. The motion of shaft 102 in this longitudinal or axial direction is guided, at the proximal end, by shaft portion 302 which rides in bore 304 of housing 104. At the distal end, the axial movement of shaft 102 is guided by actuator assembly 112, cam plate 116 and two axially extending slots 306,308 of body 122 (shown in FIGS. 3 and 6).

Actuator assembly 112 includes a cam follower or pin 110 and a plastic insulated switch actuator or pin 114. Switch actuator 114 moves axially along in slot 308 of housing 122. Cam follower 110 rides axially along in slot 306 of body 122. Cam follower 110 further extends beyond slot 306 and couples with cam plate 116. Cam plate 116 has two guiding channels formed on its surface. The first guiding surface allows the pin to move axially toward body 122 when shaft 102 is depressed. When shaft 102 is released, the channel diverts the pin to a retaining position. When the shaft is depressed again, the pin is guided out of the retaining position and into the second channel. When the shaft is again released, the restoring force of spring 118 causes the pin to ride through the second channel and back to the initial or extended shaft position. Thus, a selective extending/retracting operation of shaft 102 is achieved.

Backup spring 120 is disposed between an upper wall of body 122 and cam plate 116. Backup spring 120 provides a force perpendicular to the longitudinal axis of shaft 102. This force is used to urge the channels of cam plate 116 into positive coupling with cam follower 110 of actuator assembly 112.

When in the extended position (see FIG. 4), spring 118 will urge shaft 102 away from body 122. This will cause the extensions of male coupler 108 to mate with the recesses of female coupler 208 and will urge rotor 204 against housing 104. O-ring 202 is disposed in a slight recess on the inner side of housing 104. O-ring 202 acts to provide a resilient bushing which slightly counteracts the force of spring 118 to maintain rotor 204 in close proximity to binary switch element 106 while allowing rotor 204 to freely rotate with shaft 102.

Figure 6:
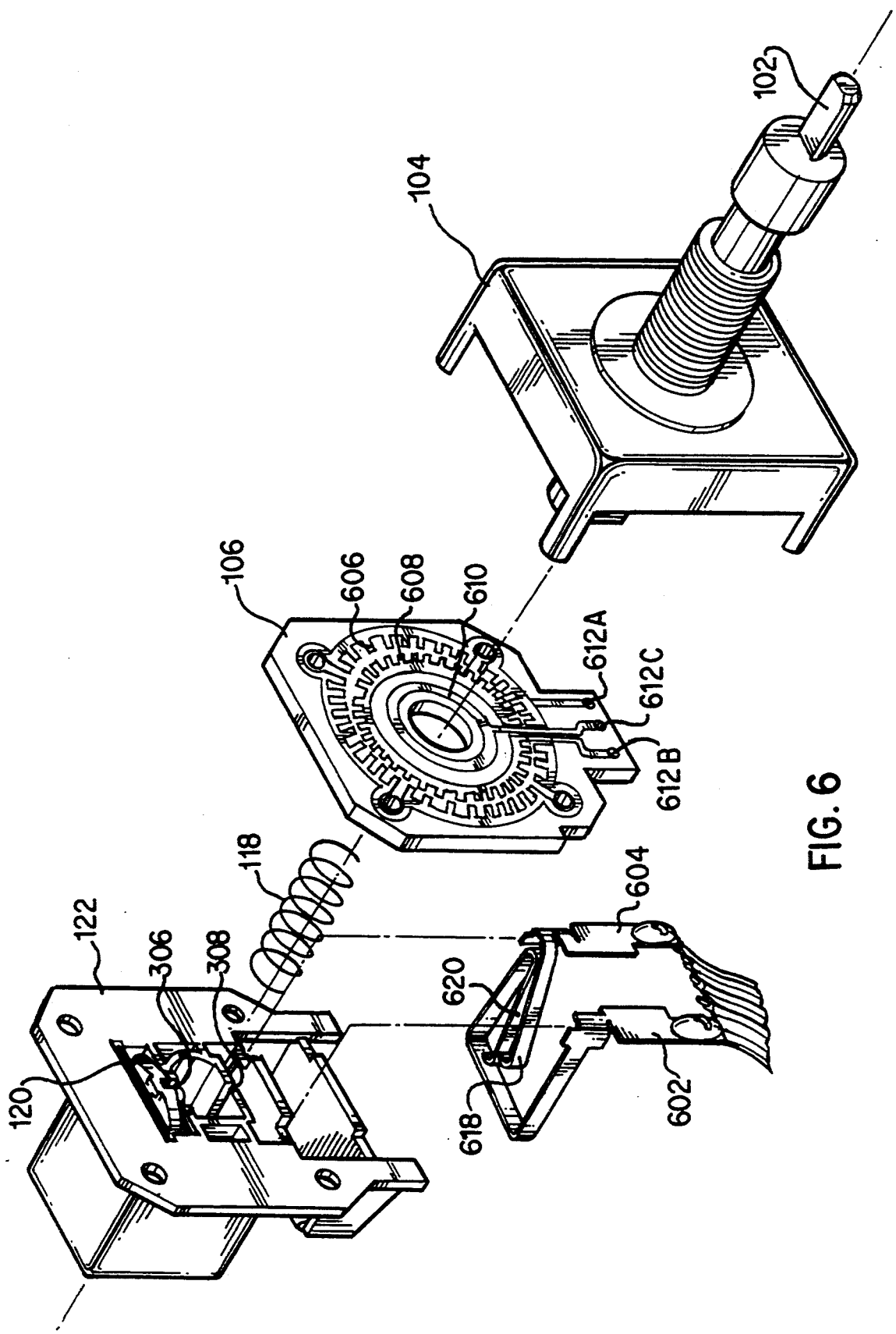
FIG. 6 is a perspective, exploded view of the encoder assembly of the invention derailing a binary switch element 106 and a body 122.

As illustrated in FIG. 6, binary switch element 106 includes two channels of conductive elements disposed on its surface. A first channel includes thirty-six conductive segments 606 spaced in a substantially circular pattern at ten degrees of radial separation. A second channel includes thirty-six conductive segments 608 which are one-half of a segment out of phase with segments 606 of the first channel. A common conductor 610 is also provided. This type of encoding technique is known in the art.

Contact spring assembly 206 includes individual contact spring elements 206A–206D which contact the adjacent surfaces of binary switch element 106. Contact spring element 206A contacts segments 606. Contact spring element 206B contacts segments 608. Contact spring elements 206C and 206D contacts common conductor 610. As rotor 204 "(obscured from view in FIG. 6 by housing 104)" rotates, the contact springs make varying connections between the segments on each contact ring and the common conductor. These varying connections are detectable at interconnect points 612 which include points 612A for channel A, point 612B for channel B, and 612C for the common conductor. Again, this type of digital position encoding is known in the art.

Figure 3:
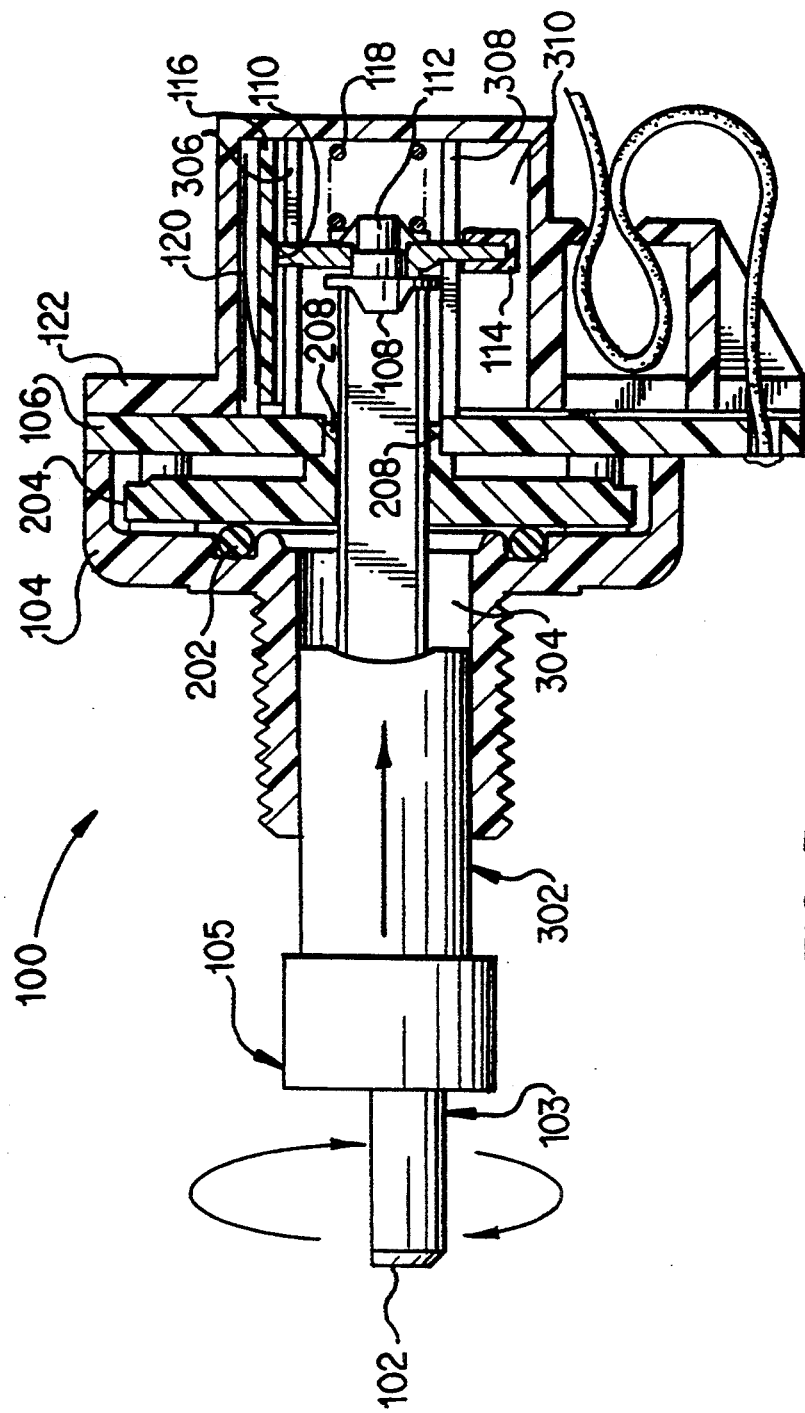
FIG. 3 is a cross-sectional view of the encoder assembly of the invention in the retracted position.

FIG. 3 is a cross-sectional view of encoder 100 with shaft 102 in the retracted position. Note that the anti-backlash coupling is disengaged. When shaft 102 is in this retracted position, male coupler 108 will be disengaged from female coupler 208. In this position, backlash will be present between shaft 102 and rotor 204. However, this is normally considered the storage position of the encoder and adjustment is normally not performed.

In the retracted position, switch actuator 114 of actuator assembly 112 will depress an arm 618 of switch moving contact 604 against an arm 620 of switch stationery contact 602. Both contacts are disposed in area 310 of body 122. As discussed above, this simple switch arrangement can be used to perform a toggle switch function, such as, controlling the power on/off function in an automobile audio system.

Figure 4:
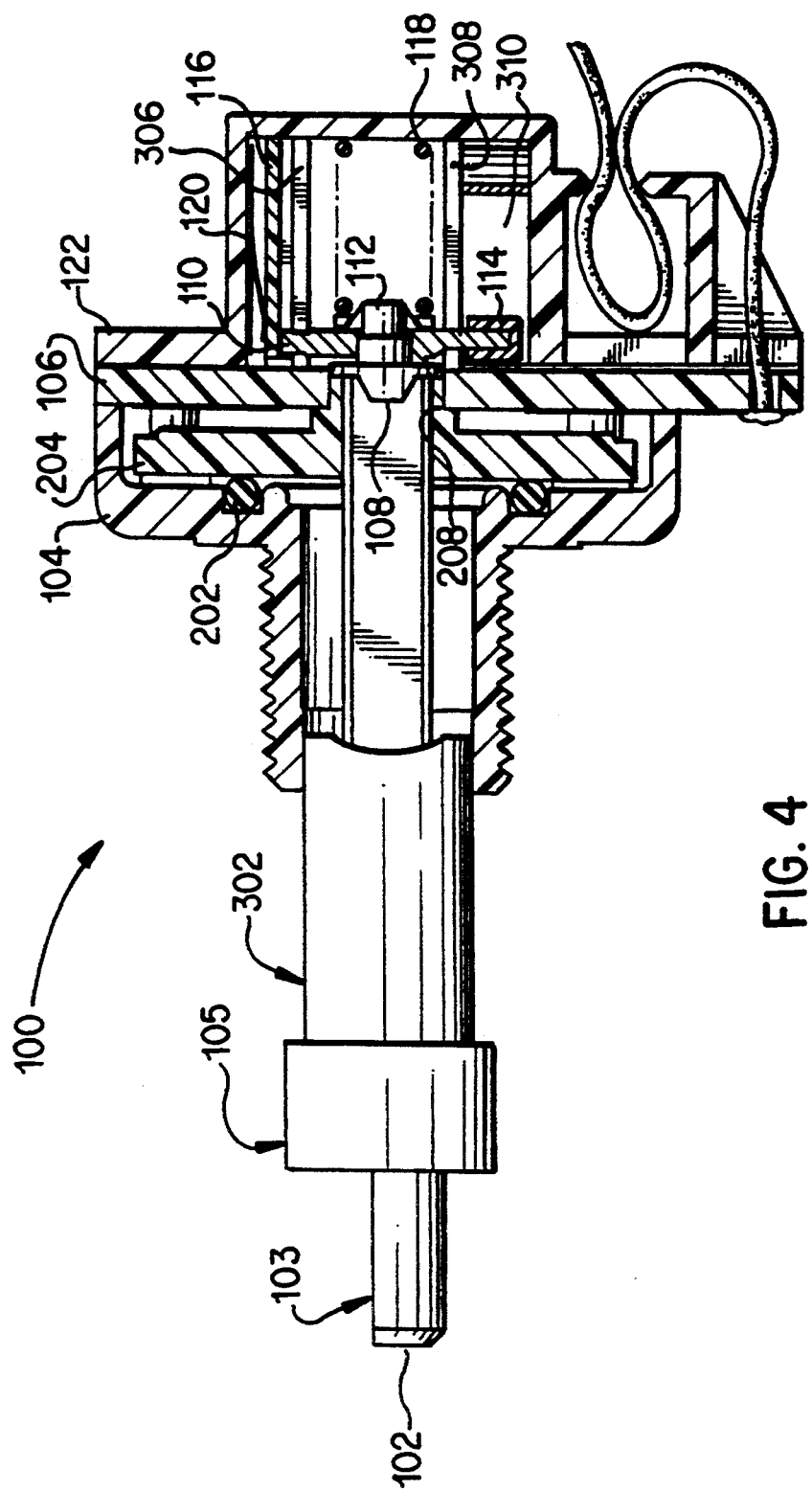
FIG. 4 is a cross-sectional view of the encoder assembly of the invention in the extended position.

FIG. 4 illustrates encoder 100 with shaft 102 in the extended position. Note now that the anti-backlash coupling is fully engaged. In this extended position, the force of spring 118 urges the wedge-shaped extension of male coupler 108 into the wedge-shaped recesses of female coupler 208. This wedging action provides a positive coupling between shaft 102 and rotor 204 and substantially eliminates all backlash.

Figure 5:
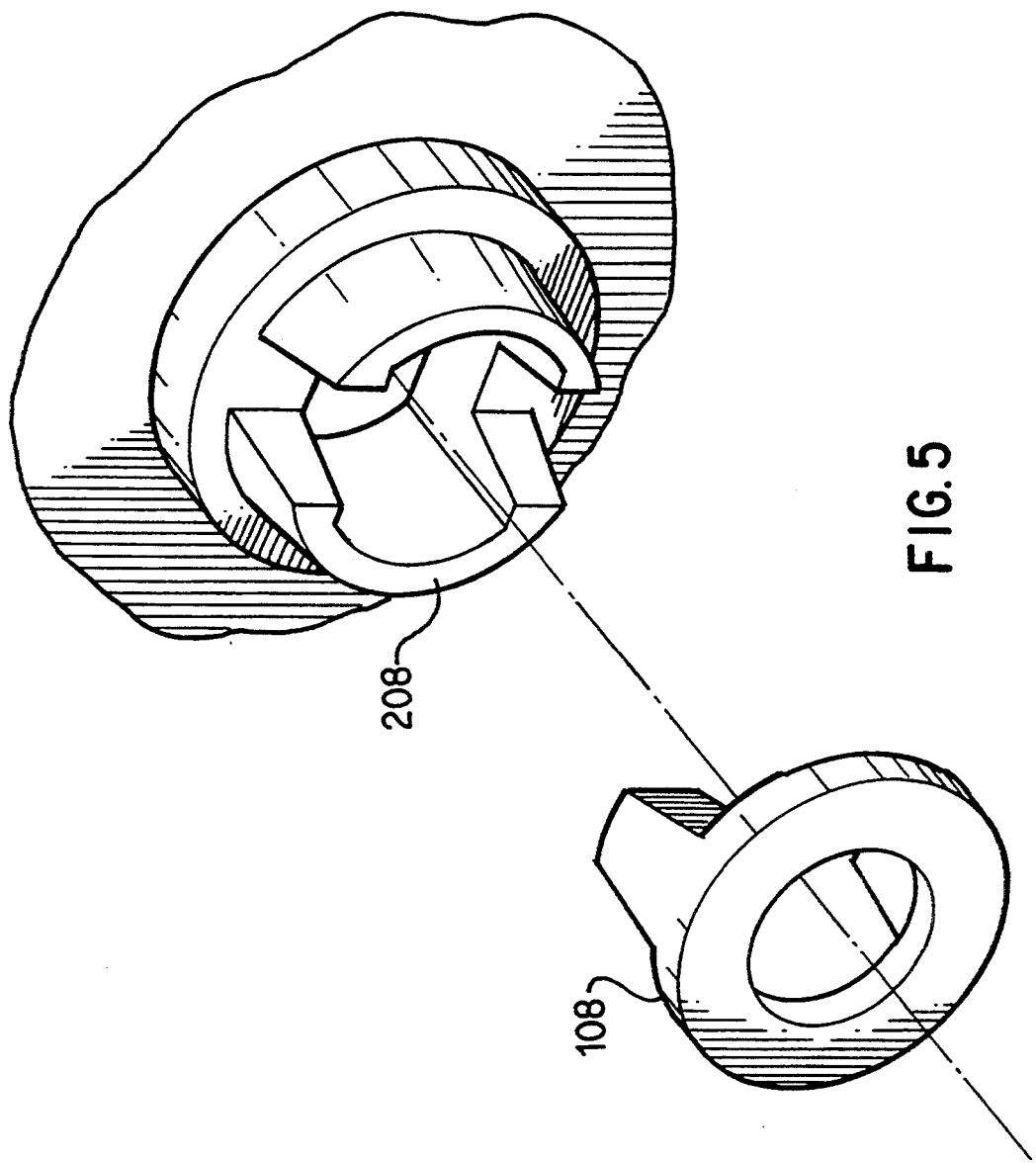
FIG. 5 is a perspective view of the anti-backlash coupling of the invention illustrating the mating relationship between male coupler 108 and female coupler 208.

FIG. 5 illustrates the anti-backlash coupling of the invention. As explained above, the anti-backlash coupling includes a male coupler 108 and a female coupler 208. Wedge-shaped extensions on member 108 are configured to mate with female wedge-shaped recesses on member 208. In this preferred embodiment, member 108 is fixedly coupled to shaft 102 and member 208 is fixedly coupled to rotor 204. Note, however, that this is not required. Members 108 and 208 are interchangeable. Note also that member 108 has two extensions to mate with two recesses of member 208. While this is the preferred embodiment, any number of extension/recess pairs may be used. However, the durability and manufacturability of the anti-backlash coupling must be considered in providing a greater or lesser number of extension/recess pairs.

In the preferred embodiment, the wedge shape of male coupler 108 and female coupler 208 is a thirty degree included angle. That is, the surfaces of each male extension of coupler 108 or each female recess 208 are spaced at a thirty degree angle. Also, the through hole in male coupler 108 is formed with small ribs on its inner surface. These ribs, designed to shear off in a tight friction fit, ensure that coupler 108 fits tightly on shaft 102.

The anti-backlash coupling is an important feature of the invention. It has been described in the environment of a digital position encoder. The inventors, however, contemplate that the anti-backlash coupling will have many other applications.

In the preferred embodiment, binary switch element 106 is a ceramic plate. The conductive segments (including portions of dielectric) are deposited on the plate using known techniques. Couplers 108,208 are injection molded from engineering plastics. Preferably, male coupler 108 is made from a high compressive strength material such as VALOX, available from General Electric Corp. VALOX is a polyester resin containing thirty percent glass fiber filler. Female coupler 208 is formed as an integral part of rotor 204 and is made from nylon. Actuator assembly 112 is made from zinc. Switch actuator 114 includes a non-conductive plastic cap. All other components are formed using standard materials as is known in the art.

A particular application may require position adjustment of the encoder in both the retracted and the extended positions. Should this requirement occur, then two anti-backlash couplings may be used. One anti-backlash coupling will mate to eliminate backlash when the encoder is in the extended position. The other anti-backlash coupling will mate to eliminate backlash when the encoder is in the retracted position. This will allow precise adjustment in both positions.

The preferred embodiment of the invention has been described in the environment of a position encoder. It should be understood, however, that the anti-backlash coupling of the invention may be used with any panel control requiring both rotary and translational motion. The term "panel control" is intended to encompass position encoders, potentiometric devices, variable capacitors, and the like.

Moreover, the invention has been described and illustrated with a certain degree of particularity, however, those skilled in the art will recognize a variety of additional applications and appropriate modifications within the spirit of the invention and the scope of the claims.

What is claimed is:

1. An apparatus for eliminating backlash in a panel control of the type having a shaft-retracted position for storage and a shaft-extended position for adjustment, wherein the panel control includes a keyed shaft and a similarly keyed rotor mounted on said shaft such that the rotor rotates with the shaft while allowing free longitudinal translation of the shaft through the rotor, the apparatus comprising:
   a first wedge member fixedly coupled to said shaft; and
   a second wedge member fixedly coupled to said rotor for mating with said first wedge member when the shaft is in the extended position,
   wherein mating of said first and second wedge members substantially eliminates rotational backlash between said rotor and said shaft.

2. The apparatus of claim 1, wherein:
   said first wedge member comprises a first annulus having at least one outwardly tapering extension which extends longitudinally toward the rotor, substantially parallel to the shaft; and
   said second wedge member comprises a second annulus having at least one inwardly tapering recess configured and arranged to mate with said at least one outwardly tapering extension of said first wedge member.

3. The apparatus of claim 2, wherein said second wedge member is an integral part of the rotor.

4. The apparatus of claim 2, wherein said first wedge member comprises two outwardly tapering extensions disposed approximately 180° apart on said first annulus, and said second wedge member comprises two inwardly tapering recesses disposed approximately 180° apart on said second annulus.

5. The apparatus of claim 1, wherein:
   said second wedge member comprises a first annulus having at least one outwardly tapering extension which extends longitudinally toward said first wedge member, substantially parallel to the shaft; and
   said first wedge member comprises a second annulus having at least one inwardly tapering recess configured and arranged to mate with said at least one outwardly tapering extension of said second wedge member.

6. The apparatus of claim 5, wherein said second wedge member is an integral part of the rotor.

7. The apparatus of claim 5, wherein said second wedge member comprises two outwardly tapering extensions disposed approximately 180° apart on said first annulus, and said first wedge member comprises two inwardly tapering recesses disposed approximately 180° apart on said second annulus.

8. An apparatus for eliminating backlash in an electronic encoder of the type having a shaft-retracted position for storage and a shaft-extended position for adjustment, wherein the encoder includes a keyed shaft and a similarly keyed rotor mounted on said shaft such that the rotor rotates with the shaft while allowing free longitudinal translation of the shaft through the rotor, the apparatus comprising:

a first coupler fixedly attached to one of the rotor and the shaft, said first coupler having at least one outwardly tapering extension which extends longitudinally outward from said one of the rotor and the shaft toward the other one of the rotor and the shaft substantially parallel to the shaft; and a second coupler fixedly attached to the other one of the rotor and the shaft, said second coupler having at least one inwardly tapering recess configured and arranged to mate with said at least one outwardly tapering extension of said first coupler to substantially eliminate backlash between the shaft and the rotor when the shaft is in the extended position.

9. The apparatus of claim 8, wherein said first coupler comprises a first annulus having two outwardly tapering extensions disposed approximately 180° apart thereon, and said second coupler comprises a second annulus having two inwardly tapering recesses disposed approximately 180° apart thereon.

10. The apparatus of claim 9, wherein said first coupler is fixedly coupled to the shaft and wherein said second coupler is fixedly coupled to the rotor.

11. The apparatus of claim 9, wherein said second coupler is fixedly coupled to the shaft and wherein said first coupler is fixedly coupled to the rotor.

12. An electronic encoder assembly of the type having a shaft-retracted position for storage and a shaft-extended position for adjustment, comprising:

a keyed shaft rotatable about a longitudinal axis;

a rotor having a keyed opening through which said shaft is passed, said opening engaging said shaft such that said rotor rotates with said shaft about said longitudinal axis while allowing said shaft to translate freely through said opening along said longitudinal axis between the shaft-retracted position and the shaft-extended position;

a first coupler fixedly attached to one of said rotor and said shaft, said first coupler having at least one outwardly tapering extension which extends longitudinally outward from said one of said rotor and said shaft to the other one of said rotor and said shaft substantially parallel to said longitudinal axis;

a second coupler fixedly attached to the other one of said rotor and said shaft, said second coupler having at least one inwardly tapering recess configured and arranged to mate with said at least one outwardly tapering extension of said first coupler; and sense means for sensing the position of said rotor and allowing electrical detection thereof;

wherein said at least one inwardly tapering recess of said second coupler engages said at least one outwardly tapering extension of said first coupler to substantially eliminate backlash between said shaft and said rotor when said shaft is in said extended position.

13. The electronic encoder assembly of claim 12, further comprising:

a spring configured and arranged to urge said first coupler into engagement with said second coupler; and selective retention means for alternately restraining said spring to maintain said shaft in the retracted position and allowing said spring to urge said first coupler into engagement with said second coupler.

14. The electronic encoder assembly of claim 13, wherein said rotor comprises a substantially circular shaped disk having a pattern of conductive material disposed on one side thereof, and wherein said sense means comprises a plurality of conductive contact springs held in ohmic contact with said pattern of conductive material.

15. The electronic encoder assembly of claim 13, wherein said keyed shaft comprises a substantially circular cross-section with two flat, substantially parallel sides, and wherein said keyed opening has a substantially similar shape.

16. The electronic encoder assembly of claim 15, wherein said first coupler comprises a first annulus having two outwardly tapering extensions disposed approximately 180° apart thereon, and said second coupler comprises a second annulus having two inwardly tapering recesses disposed approximately 180° apart thereon.

* * * * *